United States Patent [19]
Klein et al.

[11] Patent Number: 5,784,837
[45] Date of Patent: Jul. 28, 1998

[54] COLLAPSIBLE TRANSPORTABLE DECK FOR A HOUSE TRAILER OR MOBILE HOME

[76] Inventors: Darrel J. Klein, R.R. 2, Box 17, Breckenridge, Minn. 56520; Darin D. Klein, P.O. Box 63, Holyoke, Colo. 80734

[21] Appl. No.: 590,881

[22] Filed: Jan. 24, 1996

[51] Int. Cl.⁶ .................................................. E04H 1/12
[52] U.S. Cl. ........................... 52/143; 52/64; 52/182
[58] Field of Search ........................... 52/143, 64, 19, 52/182, 69

[56] References Cited

U.S. PATENT DOCUMENTS

| | | | |
|---|---|---|---|
| 1,696,113 | 12/1928 | Gilkison . | |
| 2,003,598 | 6/1935 | Lehrer et al. | 296/23 |
| 2,003,816 | 6/1935 | Allen et al. | 296/23 |
| 3,180,654 | 4/1965 | Westfall | 280/30 |
| 3,596,416 | 8/1971 | Hojka | 52/64 |
| 3,712,006 | 1/1973 | Bea | 52/143 X |
| 3,750,351 | 8/1973 | Greenburg | 52/143 X |
| 4,240,646 | 12/1980 | Scott | 52/143 X |
| 4,413,855 | 11/1983 | Flanagan | 52/143 X |
| 4,447,055 | 5/1984 | Ahrens | 472/116 X |
| 4,484,738 | 11/1984 | Ahrens et al. | 472/116 |
| 4,487,411 | 12/1984 | Ahrens | 472/116 |
| 4,824,163 | 4/1989 | Hendrych | 296/100 |
| 4,883,306 | 11/1989 | Stucky | 52/143 X |
| 5,094,048 | 3/1992 | Woo | 52/143 |
| 5,094,285 | 3/1992 | Murray | 160/46 X |

FOREIGN PATENT DOCUMENTS 763757  2/1934  France ................................. 160/53

Primary Examiner—Carl D. Friedman
Assistant Examiner—Beth A. Aubrey
Attorney, Agent, or Firm—James V. Harmon

[57] ABSTRACT

A portable and collapsible deck suited for use at the entrance of a house trailer or mobile home includes a floor formed from wood or metal. The floor has opposed longitudinally extending side edges and opposed laterally extending front and rear edges. The deck also includes at least one movable wall with an edge at the level of the floor that is connected to one of the side edges of the floor. Each wall is movable between a vertical collapsed position extending upwardly from a side edge of the floor when the deck is being transported and a horizontal deployed position extending laterally from the floor. The deck includes a framework supporting the floor of the deck and the framework includes ground-engaging wheels mounted for rotation at the bottom of the framework. A coupling at the front of the deck to facilitates connecting the deck to a towing vehicle such as a truck for moving the deck from one location to another. When the deck is set up for use, a plurality of spaced apart foundation columns are located beneath the deck and extend upwardly from the ground to support the deck in a fixed position. When the deck is to be moved to a new location it can be collapsed by elevating the walls.

26 Claims, 5 Drawing Sheets

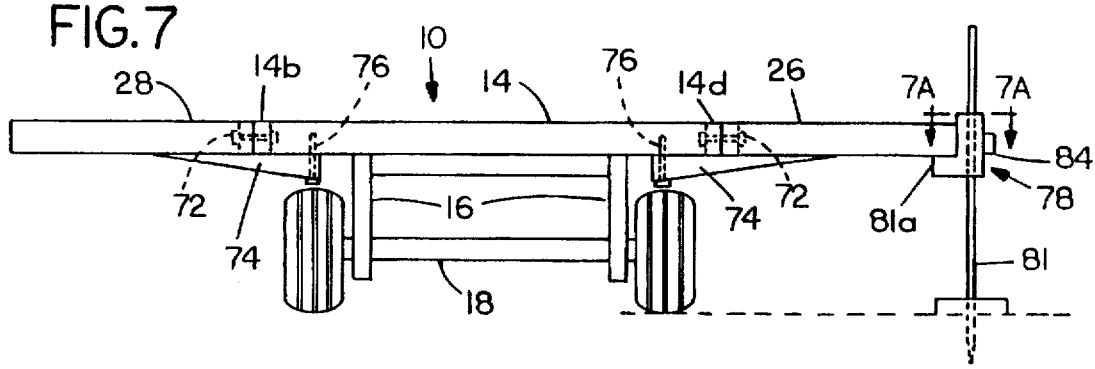
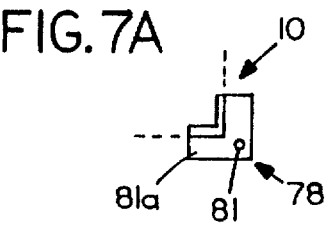
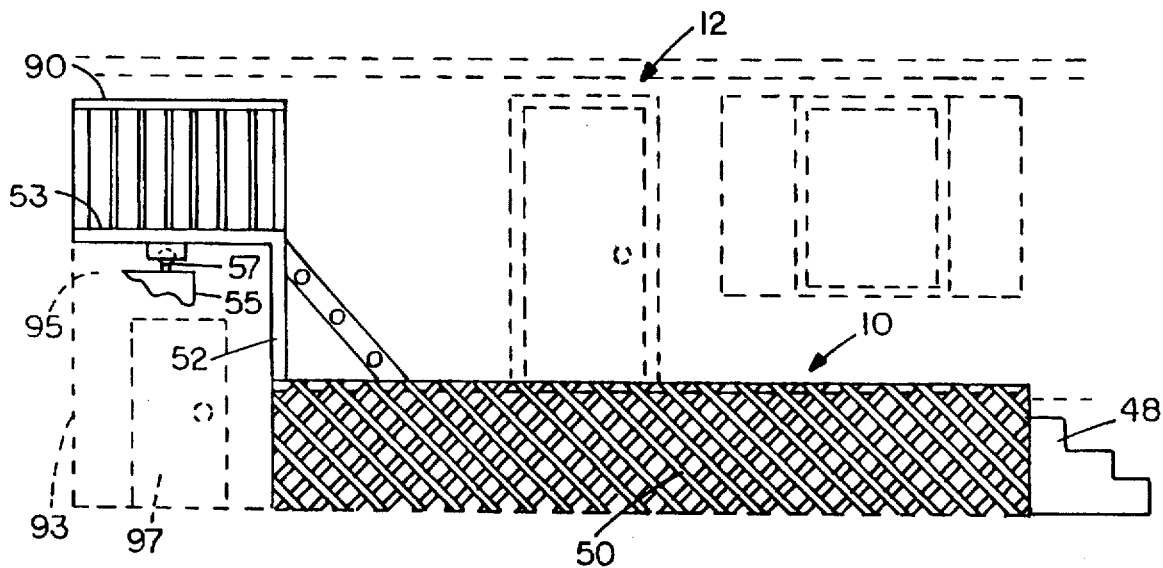

COLLAPSIBLE TRANSPORTABLE DECK FOR A HOUSE TRAILER OR MOBILE HOME

FIELD OF THE INVENTION

This invention relates to building structures and more particularly to a portable deck that can be easily transported from one location to another.

BACKGROUND OF THE INVENTION

A conventional deck is time consuming to construct and very difficult to transport from one location to another. This problem is especially troublesome for the owner of a house trailer or mobile home that has a deck which must be moved to a new location because a conventional deck has to be disassembled completely and the individual parts transported in a moving van when the owner moves to another area.

The primary objective of the present invention is to provide an improved deck which overcomes these problems by allowing the owner to easily transport the deck from one location to another where it can be quickly and efficiently deployed for use with relatively little effort.

A further object is to provide a portable and transportable deck that serves as a vehicle, e.g., a trailer or wagon in which other articles can be transported to the new location where the deck is to be set up for use.

It is a more specific object to provide an improved deck that can be converted quickly to a trailer of any length or width and hauling capacity including single, tandem or multiple combinations of supporting wheels with a coupling at one end to facilitate connecting the deck to a towing vehicle.

Further objectives are to provide a choice of either rigid or hinged fasteners between side and floor portions of the deck, to provide effective support for the deck once installed in a fixed location, an optional raised deck platform, an optional storage room, and optional power-operated actuators for collapsing and expanding the deck.

These and other more detailed and specific objects of the present invention will be better understood by reference to the following figures and detailed description which illustrate by way of example but a few of the various forms of the invention within the scope of the appended claims.

SUMMARY OF THE INVENTION

The invention provides a portable and collapsible deck that is especially well suited for use at the entrance of a house trailer or mobile home. The deck includes a floor, typically formed from wood or metal. The floor has opposed longitudinally extending side edges and opposed laterally extending front and rear edges. The deck also includes at least one movable wall with an edge at the level of the floor that is connected to the adjacent side edge of the floor. Preferably, one such wall is connected to each side edge of the floor. Each wall is movable between a vertical collapsed position extending upwardly from a side edge of the floor when the deck is to be transported and a horizontal deployed position extending laterally from the floor. The deck includes a framework supporting the floor of the deck and the framework includes ground-engaging wheels mounted for rotation at the bottom of the framework. A coupling means is also provided at the front of the deck to facilitate connecting the deck to a towing vehicle such as a truck that is used for moving the deck from one location to another.

The deck has at least one mating edge that can be adapted to conform to an adjacent wall of a house trailer or mobile home so that it can be positioned next to the entrance. When the deck is set up for use, a plurality of spaced apart foundation columns are located beneath the deck and extend upwardly from the ground to support the deck in a fixed position. During use, a person can walk from the house trailer or mobile home onto the deck. However, when the deck is to be moved it can be collapsed for being transported by means of the towing vehicle to the new location. While the deck is especially well suited for use next to a house trailer or mobile home, it can also be used for other applications, e.g., as a bandstand or as a base for a parade float or, if desired, chairs can be placed on it to provide seating at athletic or musical events or other performances.

THE FIGURES

FIG. 7 is a front end elevational view of another form of deck in accordance with the invention;

FIG. 7A is a horizontal sectional view taken on line 7A—7A of FIG. 7;

FIG. 8 is a side elevational view of another form of deck in accordance with the invention;

DETAILED DESCRIPTION OF THE INVENTION

Figure 1:
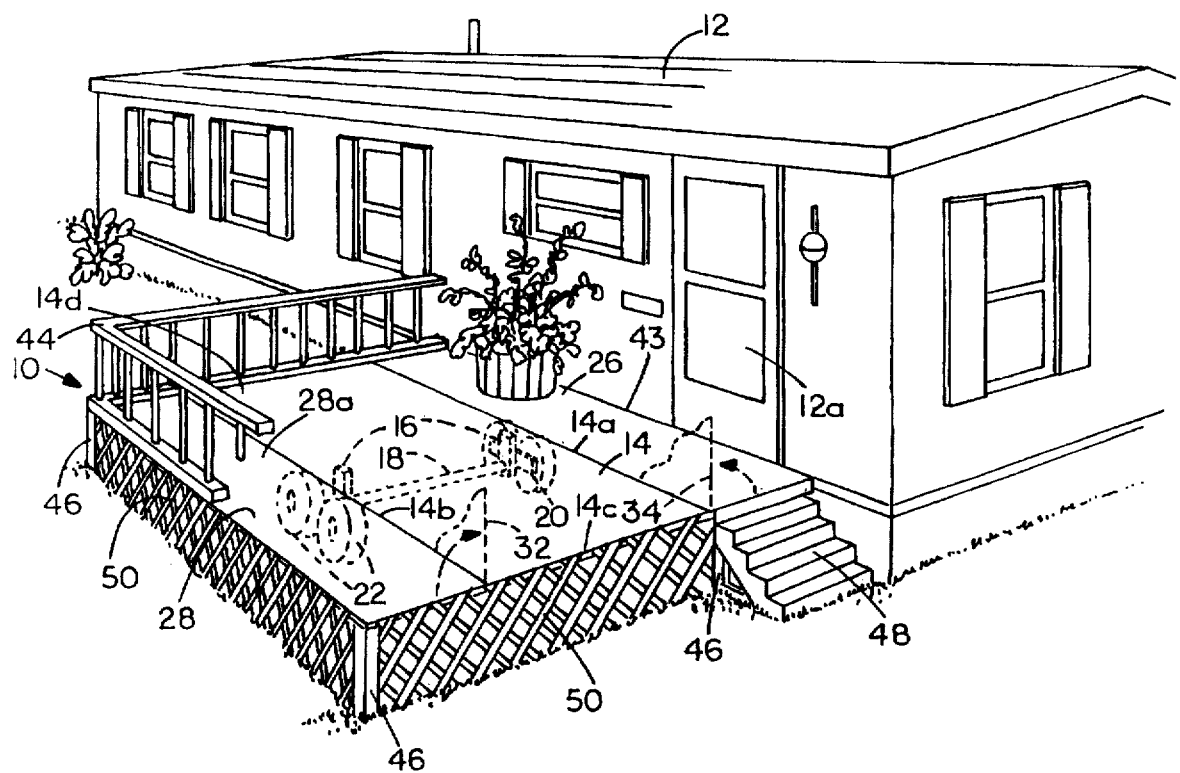
FIG. 1 is a perspective view showing the deck deployed for use next to a house trailer.
Figure 2:
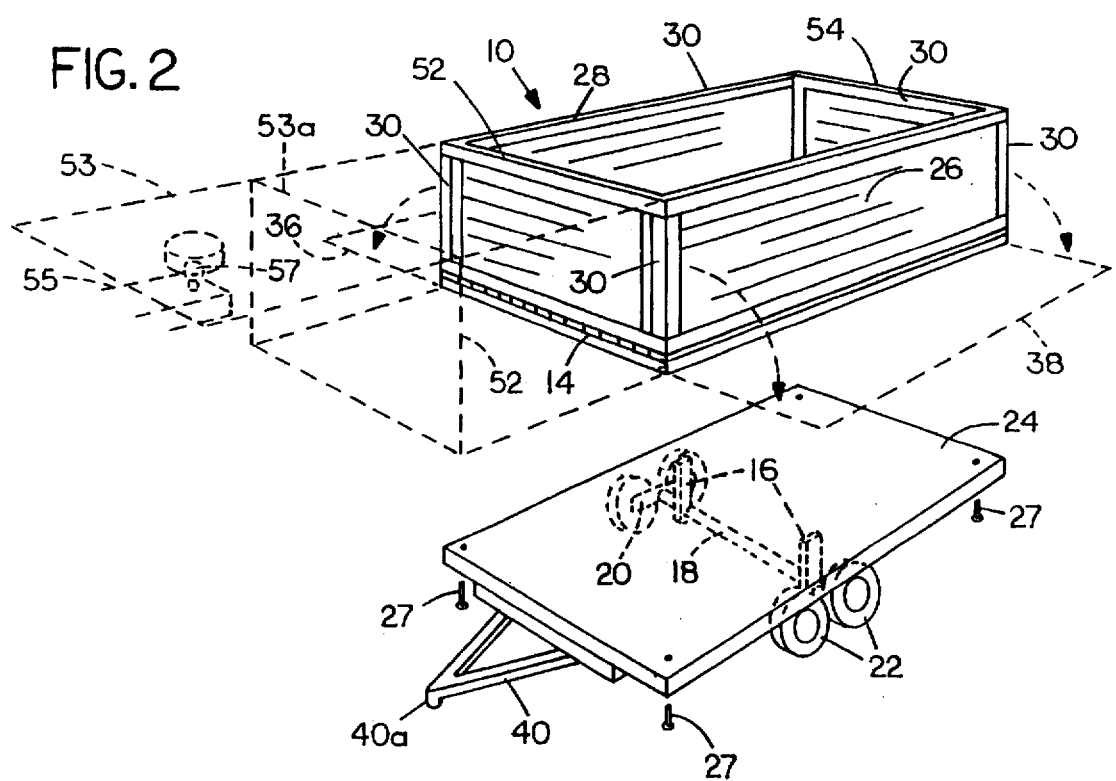
FIG. 2 is an exploded view of one form of deck that includes a trailer framework having a subfloor.

Refer now to the figures in which the same numerals refer to corresponding parts and especially to FIGS. 1 and 2.

Shown in FIG. 1 is a deck 10 deployed for use in a fixed position adjacent to a house trailer 12. The collapsible and transportable deck 10 includes a floor 14 having laterally spaced apart longitudinally extending side edges 14a, 14b, front and rear edges 14c and 14d, respectively, and a framework including supporting columns 16 which are connected at their lower ends to a transversely extending axle 18 carrying at its ends pivoted arms 26 to which are connected ground wheels 22. If desired, the framework columns 16 can be connected directly, e.g., by bolts (not shown), to the floor 14 or, in the alternative as shown in FIG. 2, the columns 16 can be connected rigidly, e.g., as by welding, to a rectangular metal or wooden subfloor 24 which forms a part of the deck framework that in this case is separate from the floor 14 itself but is rigidly connected to it, e.g., by means of bolts 27 (FIG. 2). The subfloor 24 can be provided with stake pockets (not shown) and/or bolt openings on the sides or ends. Thus, the invention contemplates two alternative forms of construction: one with framework members 16 connected directly to the floor 14 and another somewhat more expensive form in which the framework members 16 are connected to the subfloor unit 24 as a part of the framework separate from the deck floor 14.

The deck 10 includes at least one but more preferably two or more walls 26 and 28 with edges 26a, 28a, respectively, at the level of the floor 14 that are connected to one of the side edges 14a, 14b of the floor 14. The walls 26, 28 and floor 14 can be formed from any suitable construction material, e.g., wood or metal. However, wooden boards are preferably used. These may be connected to each other by means of wooden stringers or joists 30 (FIG. 2) of suitable known construction and the deck 10 can be assembled from any of a variety of other building materials, e.g., wooden or metal panels and the like known in the art, or in various other ways as will be described more fully herein below.

Each of the walls 26, 28 is movable between a vertical or collapsed position (shown in solid lines in FIG. 2 and in dotted lines at 32 and 34 in FIG. 1) and a horizontal deployed position extending laterally from the floor 14 as shown in dotted lines at 36, 38 in FIG. 2. At the front of the deck 10 is provided a coupling means such as a tow bar 40 (FIG. 2). The tow bar 40 is provided at its front end with a ball-and-socket joint 40a of any suitable known construction. The tow bar 40 is fastened to the front of the deck 10 either to the subfloor 24 of the framework of FIG. 2 or directly to the deck floor 14 adjacent the front edge 14c (FIG. 1) to facilitate connecting the deck 10 to a towing vehicle, e.g., a truck 42 (FIG. 4), when the deck 10 is to be transported from one location to another.

Figure 4:
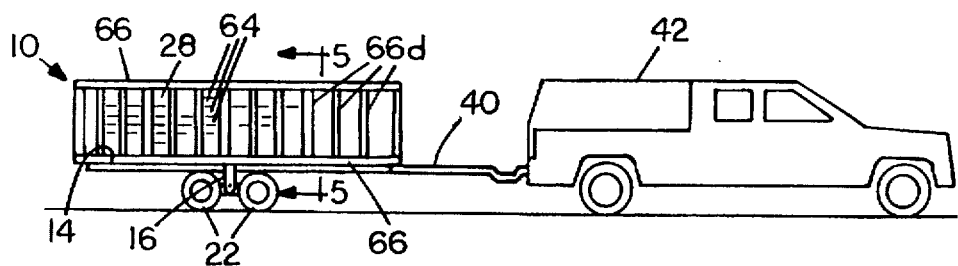
FIG. 4 is a side elevational view showing the deck in a collapsed condition when being transported from one location to another.
Figure 11:
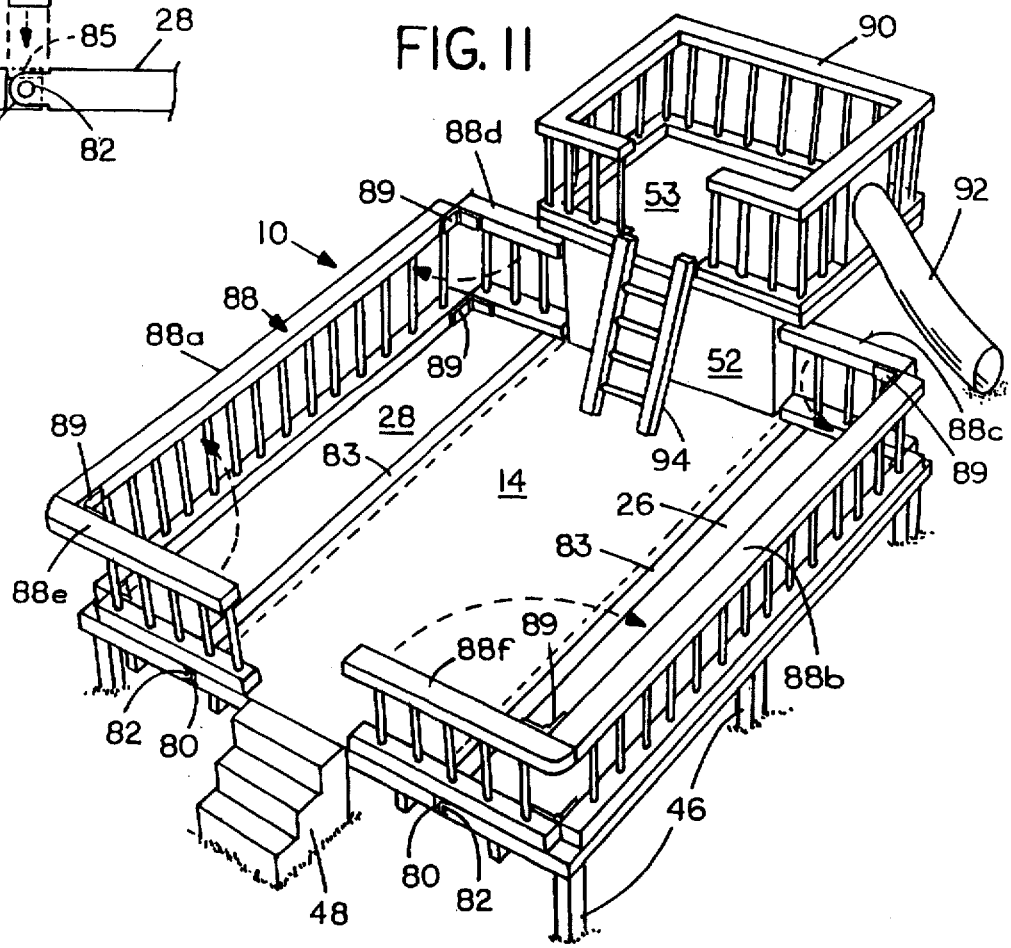
FIG. 11 is a perspective view of the deck of FIG. 8 with a peripheral railing.

As shown in FIG. 1 the deck 10 includes a mating edge 43, which in this case is the outermost edge of the wall 26, that is adapted to conform to an adjacent wall of a house trailer 12 so that the deck 10 can be positioned adjacent to the entrance 12a of the house trailer 12. Consequently, when the deck 10 is deployed for use in a fixed position next to the trailer 12, a person can walk from the house trailer or mobile home, as the case may be, onto the deck 10. If desired, the deck can be spaced from other structures (FIG. 11). The deck 10 of FIG. 1 can be partially or completely surrounded by means of an upwardly projecting, peripherally extending, vertically disposed optional railing 44 (which is only partially shown in FIG. 1). The railing 44 is rigidly secured, e.g., by means of nails or bolts, to the peripheral edge of the deck 10. Strategically placed beneath the deck 10 are a plurality of spaced apart supports of any suitable type which will be referred to in a generic sense as "foundation columns" 46. Columns 46 are located beneath the deck 10 and extend upwardly from the ground to support the deck 10 in a fixed position wherever it is to be used, e.g., next to the house trailer or mobile home 12 after the deck 10 is thus set up for use as shown in FIGS. 1 and 4. Once the deck 10 is set up for use as shown in FIG. 1, stairs 48 can be placed to extend from one side edge thereof to the ground. The space beneath the deck 10 can also be enclosed by means of a skirt 50 of any suitable known construction, e.g., wooden lattice or plastic sheeting.

Figure 3:
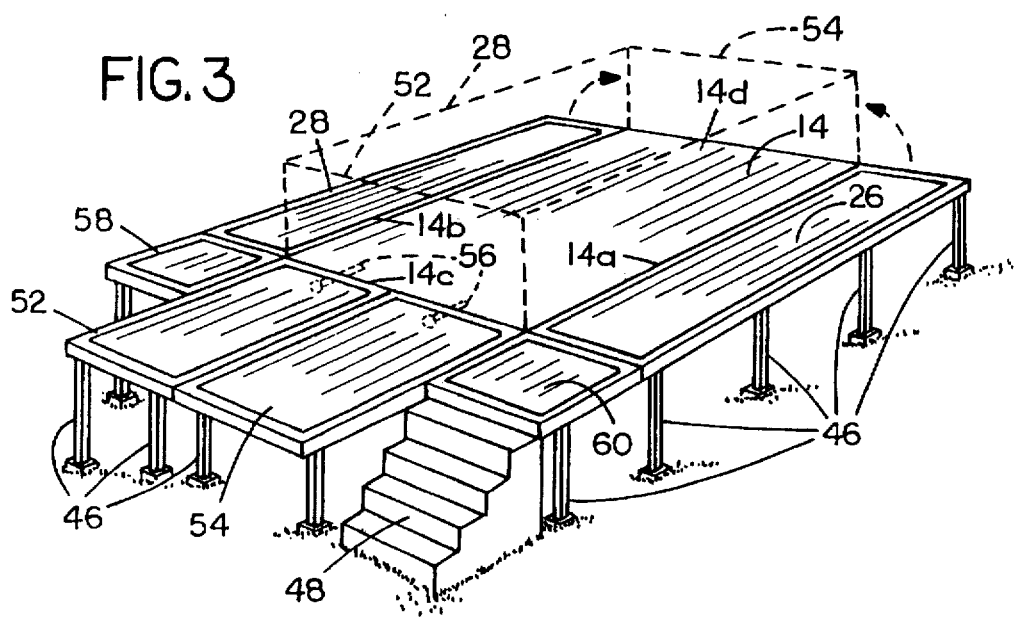
FIG. 3 is a view of the deck of FIG. 2 as it appears deployed for use in a fixed position.

Refer now to FIGS. 2 and 3 wherein the same numerals refer to corresponding parts already described. The deck of FIG. 2 also includes front and rear walls 52, 54 which are folded upwardly to a vertical position as shown in FIG. 2 and by dotted lines in FIG. 3 but which can be detached, placed in a horizontal position adjacent to the floor 14 (FIG. 3) and connected to the front edge 14c of the floor 14 by means of fasteners, e.g., bolts 56. Smaller auxiliary panels 58, 60 can also be provided for extending the side walls 26, 28 toward the front of the deck as shown in FIG. 3. The auxiliary panels 58, 60 are bolted or otherwise rigidly fastened between the walls 26, 28 and the walls 52, 54, e.g., by bolts or other suitable fasteners (not shown). The entire deck 10 is shown supported in FIG. 3 by means of vertically extending spaced apart foundation columns 46 that extend upwardly from the ground and are connected to the deck 10 to hold it in a fixed, deployed position ready for use. When the deck 10 of FIG. 3 is to be transported to a new location, the walls 26, 28 are detached from the edges 14a, 14b of the floor 14 and the walls 52, 60 are disconnected, e.g., by removing fasteners such as the bolts 56. The walls 26, 28, 52, 54 are then placed in the upright positions as shown extending upwardly from the edges of the floor 14 and are secured to the floor 14 in their upright positions, preferably by using suitable removable fasteners such as bolts as will be described more fully below. The steps 48 and the auxiliary panels 58, 60 can then be placed on the floor 14 of the deck 10 along with the foundation columns 46. The ball joint 40a of the tow bar 40 can then be connected to a vehicle 42 (FIG. 4). It will be noted that the collapsed deck can be used for transporting luggage, household goods, and other articles. Thus, it acts as a cargo vehicle. The deck 10 is then ready to be moved to a new location.

FIG. 2 also illustrates an alternative form of coupling for towing the deck 10. In this form of the invention, the deck 10 is provided with a rectangular, horizontally disposed elevated auxiliary deck or platform 53 which is securely attached at its rear end 53a to the top edge of the front wall 52 so as to extend forwardly from the front of the deck 10 at the elevation of the top edge of the front wall 52. Extending downwardly from the lower surface of the platform 53 is a ball joint 57 (FIGS. 2 and 8) of suitable known construction for connecting the deck 10 to a suitable mating coupling 55 on a towing vehicle. In this case, the ball joint 57 is elevated above the floor 14 and is commonly known as a "fifth wheel" coupling which is placed in an elevated position at the rear end of a vehicle such as a pickup truck.

Figure 5:
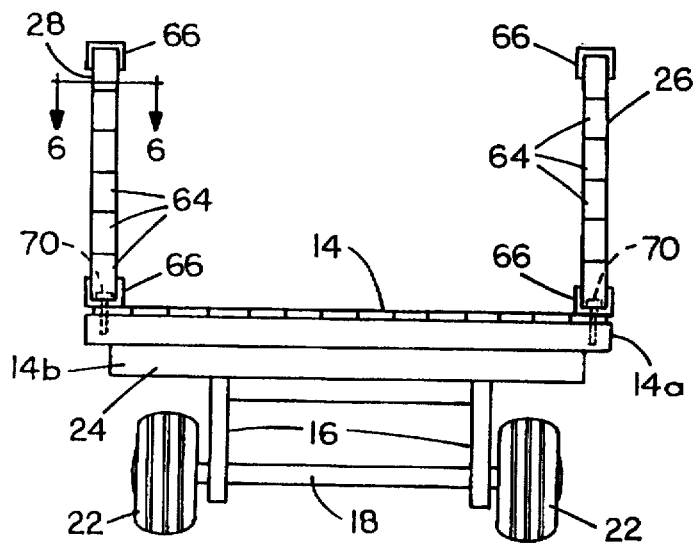
FIG. 5 is a vertical cross-sectional view of the deck taken on line 5—5 of FIG. 4.
Figure 6:
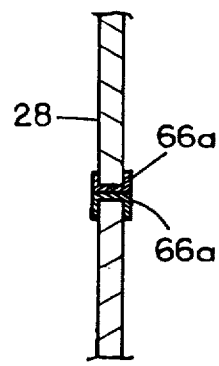
FIG. 6 is a horizontal sectional view taken on line 6—6 of FIG. 5.

Refer now to FIGS. 4, 5 and 6 which illustrate one preferred form of floor and wall construction for the deck in accordance with the invention.

As shown in FIGS. 4–6, the walls 28 and 30, in this instance, are composed of a plurality of wooden boards 64 in side-by-side longitudinally extending relationship with their side edges abutting one another. The boards 64 are captured between transverse and longitudinally extending C-shaped centrally opening metal channels 66 which serve as a framework for holding the boards 64 in place. The ends of the boards 64 are securely held in place within the channel openings of the vertical channels 66a (FIGS. 4 and 6) which are secured, e.g., by welding at their ends, to the upper and lower channels 66. When the walls 28 and 30 are in an upright collapsed position, they are rigidly secured to the side edges 14a, 14b of the floor 14 by means of removable fasteners, e.g., bolts 70 which hold them securely in place.

Refer now to FIG. 7 which illustrates another form of the invention with the side walls 26, 28 in their operative deployed position. When the walls 26, 28 are placed horizontally in their deployed positions as shown in FIG. 7, they are connected rigidly to the side edges 14a, 14b of the deck floor 14 by fasteners, e.g., bolts 72 which hold them securely in place. FIG. 7 also illustrates two forms of wall supports. One form of wall support comprises one or more pivoted braces 74 supported for pivotal movement about vertical axes upon pivots 76 so that the braces can be swung outwardly and placed beneath the walls 26, 28 to support them when deployed as shown in FIG. 7. When the deck 10 is to be moved, the braces 74 can be pivoted forwardly or rearwardly on the pivots 76 to a recessed position beneath the floor 14.

One preferred form of foundation column is shown at 78 in FIGS. 7 and 7A. In this form the foundation column 78 includes a vertical post 81 with a bracket 81a having an opening slidably mounted over the post 81 to enable the bracket 81a to be raised or lowered to any desired position for supporting the edge of the deck 10 and then locked in place in any suitable manner, e.g., by means of cleats, stops or a set screw 84. The post 81 can be pounded into the ground or placed against the surface of the ground.

Figure 9:
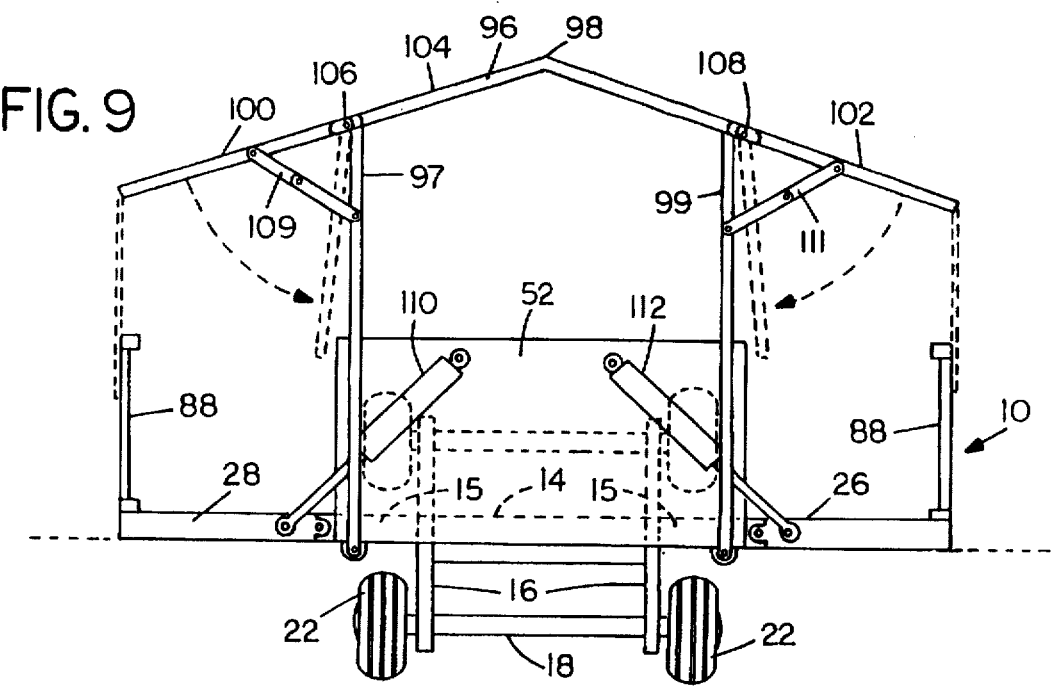
FIG. 9 is an end elevational view of another form of deck in accordance with the invention.
Figure 10:
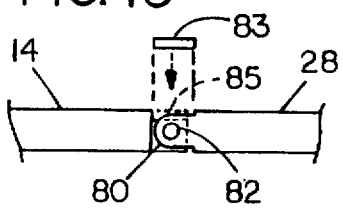
FIG. 10 is a fragmentary side elevational view of the pivotal connection between the deck floor and deck wall on an enlarged scale.

Refer now to FIGS. 8–13 which illustrate another form of the invention wherein the same numeral refer to corresponding parts already described. In this case the walls 26, 28 are provided with centrally extending wings 80 at each end to which are connected longitudinally extending aligned pivots 82 that are connected to the side edges of the floor 14 to enable the walls 26, 28 to pivot from the horizontal deployed position of FIGS. 8 and 11 upwardly to the collapsed upright position of FIG. 13 when the deck 10 is to be transported to a new location. FIG. 10 shows how a longitudinally extending spacer 83 formed from a metal or wooden strip is placed in a gap 85 above the pivot 82 when the deck is in use. The gap 85 provides sufficient space to enable the walls 26, 28 to be raised without striking portions of the floor 14.

Figure 12:
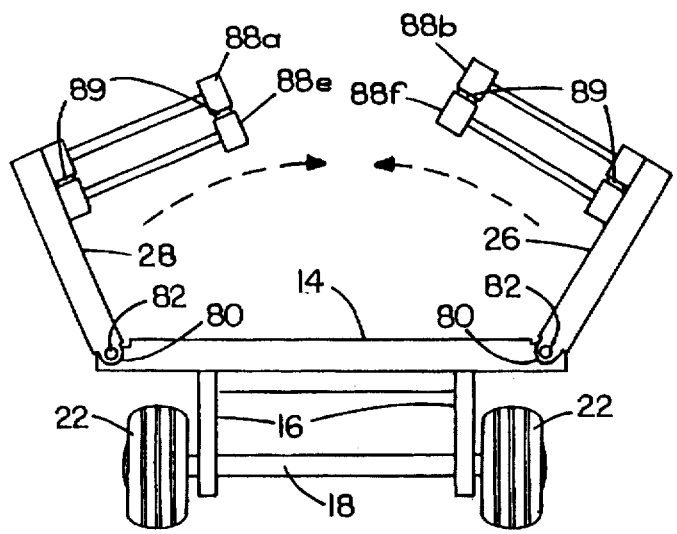
FIG. 12 is a rear elevational view of the deck of FIG. 11 in a partially collapsed condition.
Figure 13:
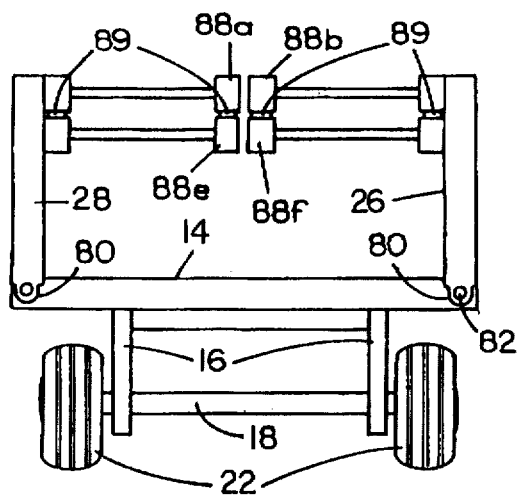
FIG. 13 is a view similar to FIG. 12 of the deck shown fully collapsed.

Refer to FIGS. 11–13 which illustrate an upwardly projecting peripherally positioned railing 88 extending almost completely around the deck 10. Railing 88 includes two longitudinally extending upright portions 88a and 88b which are rigidly secured to the distal edge of the walls 26, 28. The railing 88 also includes transversely extending railing segments 88c, 88d at the front of the deck and 88e, 88f at the rear of the deck which are hinged to the front and rear ends, respectively, of the longitudinal railing segments 88a, 88b to enable the transverse railing segments 88c–88f to be pivoted centrally to a collapsed position adjacent to the fixed segments 88a, 88b as shown in FIGS. 12 and 13. The hinges are designated 89. The walls 26, 28 are shown partially raised in FIG. 12 and fully raised to the vertical collapsed position in FIG. 13. It will be noted that the railing segments 88e–88f when folded centrally and held in place with fasteners (not shown) are out of the way and will not interfere with the raising of the walls 26, 28. The elevated platform 53 is provided with a fixed railing 90 (FIG. 11) which is secured in an upright position at the periphery of the platform 53 with suitable fasteners, e.g., nails or bolts. Any of a variety of playground equipment such as a child's slide, which in this case is shown in the form of a tube 92, can be connected to the deck 10 (specifically, to one side of the platform 53) to extend from the platform 53 to the ground so that children can be entertained by sliding from the platform 53. Access to the platform 53 can be provided by means of additional steps or a ladder 94. As shown in FIG. 8 there is optionally provided a room 93 beneath the platform 53 which comprises three connected walls 95 which the define the room and an entry, such as a door 97. The room 93 beneath the platform 53 can be used for any purpose, e.g., as storage or a shop area.

Refer now to FIG. 9 which illustrates how the invention can be provided with an optional awning 96 that covers the entire deck 10. The awning 96 is supported by means of four metal supporting posts 97, 99 (only two of which are shown) that extend upwardly from the ends of the deck 10. The awning 96 includes an elevated central peak 98 and longitudinally extending, downwardly folding side portions 100 and 102 which are hinged to a center portion 104 of the awning 96 for pivotal movement along longitudinal pivot axes 106, 108 positioned above the side edges of the floor 14 to enable the side portions 100, 102 of the awning 96 to be folded downwardly to a collapsed position (shown in dotted lines in FIG. 9) when the deck 10 is to be transported from one location to another or when the deck is to be enclosed, e.g., during bad weather. The folding side portions 100, 102 can be held in their erect solid line positions by means of pivoting braces 109, 111 connected at their lower ends to supporting posts 97, 99.

In the embodiment of FIG. 9 the floor 14 is provided with openings 15 for raising the supporting wheels 22 and the associated framework members, e.g., posts 16, above the elevation of the floor 14 as shown in dotted lines in FIG. 9 to allow the deck 10 to be lowered into contact with the ground whenever desired.

In the embodiment of FIG. 9 the deck 10 is also provided with optional power-operated actuators, in this case a pair of power-operated actuators 110, 112, preferably telescopic hydraulic actuators which are connected between the walls 26, 28 and a central portion, e.g., the end wall 52 of the deck 10. By retracting the actuators 110, 112 the walls 26, 28 will be raised and by extending the actuators, the walls 26, 28 will be pivoted downwardly to the deployed horizontal position shown in the figure. Alternatively, the walls 26, 28 can be raised and lowered by means of cable or rope engaged on a winch (not shown).

Figure 14:
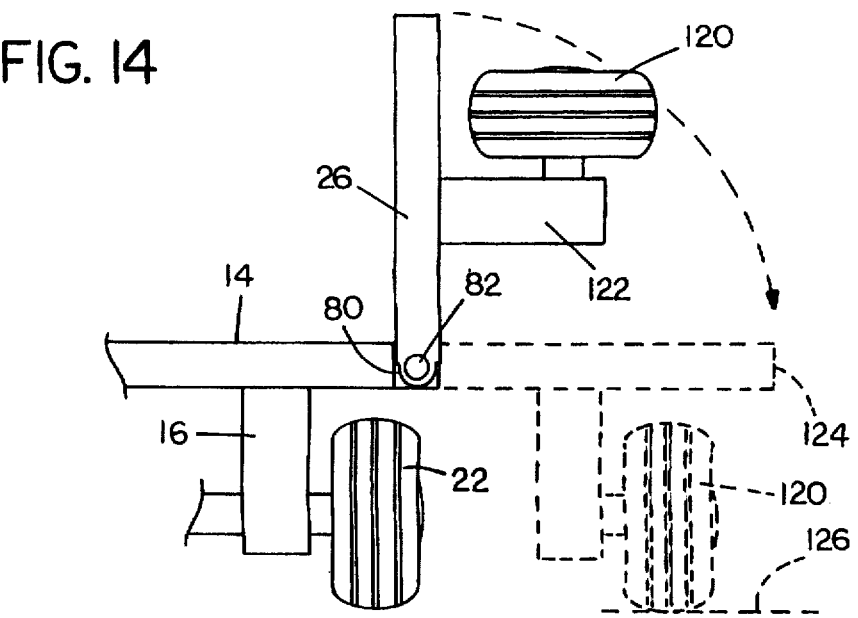
FIG. 14 is a partial front elevational view showing an optional supporting wheel attached to the lower surface of one of the walls of the deck.

Refer now to FIG. 14. In FIG. 14 is shown an auxiliary wall-supporting wheel 120 rotatably mounted at the lower end of a supporting column 122 which is rigidly connected at its upper end to the lower surface of the side wall 26. When the side wall 26 is lowered to the dotted line position 124 of FIG. 14 by pivoting it downwardly about the horizontal pivot 82, the wheel 120 will engage the ground 126 to provide auxiliary support for the pivoting wall 26. Other walls, e.g., wall 28, can be provided with a similar supporting wheel 120.

The invention thus provides a collapsible and transportable deck which also serves as a cargo trailer that can be used for carrying luggage, personal property and other articles. The deck can be easily set up for use in a fixed position after being transported to a new location. It can be made in any width or length, size or capacity. It can be made with single, tandem or multiple combinations of wheels 22 or 120. In addition, the tow bar 40 can be straight or of the type known as a "fifth wheel gooseneck" 57. The tow bar can be fixed or bolted on. In addition, the deck 10 can be mounted on a separate framework which functions as a flatbed trailer as shown in FIG. 2. The deck can form a box-like enclosure for holding cargo when the walls are collapsed to the vertical position for being transported to a new location.

When the framework includes a subfloor 24 that is separate from the floor 14, the entire framework which then acts as a flatbed trailer has the advantage of being available for other uses after the deck 10 has been set up in a stationary position. However, when the subfloor 24 is not used, the deck 10 including the framework will function as a single unit that remains assembled at all times.

Leveling of the deck 10 can be accomplished in any of various ways known in the art. For example, stake pockets (not shown) can be provided through the deck subfloor portion 24. Stakes can extend through the pockets and cleats of suitable known construction beneath the subfloor 24 can be used to support the entire unit. Alternatively, brackets 78 can be installed to the side of the bed with poles 81 in the brackets and stops provided to adjust the height of the deck walls accordingly. If desired, one can place foundation blocks or even sawhorses (all referred to herein collectively as "foundation columns") under the deck 10.

It will be understood that more than one deck unit of the present invention can be provided and each of them connected to another similar unit to provide an even larger deck, stage or platform. Different types of stairways and steps can be added, including spiral stairways which take up less space. If an occasion arises requiring towing in a deployed or open position as shown in dotted lines in FIG. 14, additional support can be provided with towing cables (not shown) provided to extend from the hitch to the outside edges of the walls 26, 28.

Many variations of the present invention within the scope of the appended claims will be apparent to those skilled in the art once the principles described herein are understood.

What is claimed is:

1. A portable and collapsible deck suited for use at the entrance of a house trailer or mobile home comprising, a floor having opposed longitudinally extending side edges and opposed laterally extending front and rear edges, at least one movable wall having a first edge at the level of the floor, fastening means for connecting one of the side edges of the floor and said first edge of the wall, said wall is movable between a) a vertical collapsed position extending upwardly from one side edge of the floor when the deck is being transported and b) a horizontal deployed position extending laterally from the floor such that the floor and wall cooperate to provide a flat, horizontally disposed substantially continuous deck surface that includes said floor and said wall, rotatable ground engaging supporting wheels below the deck, wheel support means that is separate from the wall and aligned below the floor for holding the wheels below the floor and in contact with the ground at all times to directly support the floor, said movable wall being supported by the floor, the wall being movable independent of the wheels between said horizontal and vertical positions, a plurality of spaced apart columns located beneath the deck and extending upwardly from the ground for supporting the deck in a fixed position with the wall spaced above the ground when in the horizontal deployed position, coupling means at one end of the deck to facilitate connecting the deck to a towing vehicle when the deck is to be transported from one location to another, said deck having at least one mating edge that is adapted to be placed adjacent a wall of the house trailer or mobile home, such that the deck can be located adjacent to the entrance of the house trailer to enable a person to walk from the house trailer or mobile home onto the deck when the deck is deployed and the deck can be collapsed for being transported by means of the towing vehicle from one location to another while supported on the wheels.

2. The deck of claim 1 wherein said side edges of the floor are parallel and of equal length and perpendicular to an axis of rotation of the wheels, and the fastening means are releasable fastener means for holding the wall in either said vertical collapsed position or said horizontal deployed position.

3. The deck of claim 2 wherein the fastening means are bolts.

4. The deck of claim 1 wherein the deck has a pair of said walls each hinged to one of the side edges of the floor for pivotal movement between said vertical and horizontal positions about a pair of longitudinally extending laterally spaced pivot axes.

5. The deck of claim 4 wherein power operated actuators are operatively connected to the walls and for raising the walls to the upright position or lowering the walls to said horizontal deployed position.

6. The deck of claim 4 wherein the walls have auxiliary ground wheels depending therefrom to support the walls for movement over the ground when the walls are in the horizontal deployed position.

7. The deck of claim 1 wherein a railing is connected to the movable wall of the deck at a periphery thereof to extend upwardly therefrom when deployed so as to at least partially surround the deck.

8. The deck of claim 1 wherein the deck includes a vertically extending front wall and an elevated platform projects forwardly from the top of the front wall, said platform including a ball joint that extends downwardly from a lower surface thereof for connecting the deck to a vehicle for transporting the deck when the walls are raised to an upright collapsed position.

9. The deck of claim 1 including a horizontally disposed subfloor having a top surface positioned below the floor for supporting the floor of the deck.

10. The deck of claim 1 wherein said wall comprises a plurality of boards in side by side relationship having edges abutting one another and the boards are captured between transverse channels and longitudinal C-shaped centrally opening channels that are rigidly connected to one another to define a framework for holding the boards.

11. The deck of claim 1 wherein the walls are removably bolted to the edges of the floor in an upright position, and said walls are adapted to be re-bolted in said horizontal deployed position to said edges of the deck when the deck is to be placed in a stationary position.

12. The deck of claim 1 wherein the deck has at least two such walls and the first edge of each wall is connected to one of said side edges of the floor and each wall has a distal edge parallel to the first edge, a longitudinal railing extending upwardly from the distal edge of each wall and the railing includes front and rear transverse railing segments hinged, respectively, to a front and a rear end of the longitudinal railing to enable the transverse railing segments to be pivoted to a collapsed position adjacent to the longitudinal railing so that the walls can be raised to the collapsed vertical position when the deck is to be transported from one location to another.

13. The deck of claim 12 wherein the deck has a raised platform at one end thereof and the platform has a railing connected thereto and extending upwardly from a peripheral edge thereof to at least partially surround the platform.

14. The deck of claim 13 wherein the deck includes an enclosed space for a person defined by a plurality of upright connected walls positioned beneath the platform and at least one of the connected walls has an entrance to enable a person to enter the enclosed space beneath the platform.

15. The deck of claim 1 with at least one piece of playground equipment connected thereto for providing recreation and entertainment for children.

16. The deck of claim 15 wherein the playground equipment comprises a child's slide connected to the deck and extending therefrom to the ground to enable children to slide from the deck to the ground.

17. The deck of claim 1 wherein upright supporting posts are connected to the deck and an awning is secured to an upper end of the supporting posts to cover the deck.

18. The deck of claim 17 wherein the awning has side portions that are hinged to a center portion of the awning for pivotal movement along longitudinally aligned axes above the side edges of the floor to enable the side portions of the awning to be folded downwardly to a collapsed position when the deck is to be transported from one location to another.

19. The deck of claim 1 wherein the floor includes openings for enabling the supporting wheels and said wheel support means to be raised above the elevation of the floor to allow the deck to be lowered into contact with the ground.

20. The deck of claim 1 wherein the deck includes a pair of said walls and a front wall and a rear wall having the same height as the walls, when the deck is collapsed the front and rear walls are connected in an upright position between adjacent front and rear ends, respectively, of the walls, and when the deck is deployed the front and rear walls are connected to the floor in a horizontal position as a part of the deck.

21. A portable and collapsible deck suited for use as a deck for a house trailer or mobile home and for transporting articles when collapsed, said deck comprising, a floor having a pair of opposed longitudinally extending side edges and a pair of opposed laterally extending front and rear edges, a pair of laterally spaced apart longitudinally extending movable side walls each having a first edge at the level of the floor, fastening means for connecting each of said side edges of the floor to the first edge of one of said walls, a pair of movable front and rear walls each having an edge that is connected respectively to the front and rear edges of the floor, each wall is movable between a) a generally vertical collapsed position extending upwardly from one edge of the floor when the deck is being transported and b) a horizontal deployed position extending laterally from the floor such that the floor and wall cooperate to provide a flat, horizontally disposed substantially continuous deck surface upon which people can walk that includes said floor and said front, rear and side walls, said movable walls being spaced above the ground when the walls are in the horizontal deployed position, rotatable ground engaging supporting wheels below the deck, wheel support means that is separate from the wall and aligned below the floor for holding the wheels below the floor and in contact with the ground at all times to directly support the floor, the movable walls being supported by the floor, the movable walls being movable independent of the wheels between said horizontal and vertical positions, the floor, side, front and rear walls when in said collapsed position cooperating to define a bottom and four sides of a wagon box for receiving and transporting articles from one location to another, means at one end of the deck for connecting the deck to a towing vehicle when the deck is to be transported from one location to another, such that the deck can be used as a deck for the house trailer or mobile home to enable a person to walk on the deck surface including the movable walls when the deck is deployed adjacent thereto and the deck can be collapsed for being transported by means of the towing vehicle from one location to another with articles contained in the wagon box.

22. The collapsible deck of claim 21 wherein at least some of the walls are bolted to the floor proximate one of said edges thereof.

23. The collapsible deck of claim 21 wherein at least one of said walls is hinged to the floor proximate one of said edges thereof.

24. The deck of claim 21 wherein the deck has a pair of said walls each hinged to one of the side edges of the floor for pivotal movement between said vertical and horizontal positions about a pair of longitudinally extending laterally spaced pivot axes and said fastening means are hinges.

25. The collapsible deck of claim 21 including a horizontally disposed subfloor having a top surface positioned below the floor for supporting the floor of the deck.

26. The collapsible deck of claim 21 wherein an awning is supported above the deck and the awning is at least large enough to cover the deck when the deck is in said collapsed condition to provide a cover for the wagon.

* * * * *